United States Patent
Shen (10) Patent No.: US 11,503,608 B2
(45) Date of Patent: Nov. 15, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 25 days.

(21) Appl. No.: 16/872,838

(22) Filed: May 12, 2020

(65) Prior Publication Data

US 2020/0275452 A1 Aug. 27, 2020

Related U.S. Application Data (63) Continuation of application No. PCT/CN2017/112939, filed on Nov. 24, 2017.

(51) Int. Cl.
| | | |
|---|---|---|
| *H04W 72/04* | (2009.01) | |
| *H04L 5/00* | (2006.01) | |
| *H04W 76/27* | (2018.01) | |

(52) U.S. Cl.
CPC ....... *H04W 72/0493* (2013.01); *H04L 5/0092* (2013.01); *H04W 72/0446* (2013.01); *H04W 76/27* (2018.02)

(58) Field of Classification Search
CPC ............ H04L 5/0092; H04W 72/0446; H04W 72/0493; H04W 76/27
See application file for complete search history.

(56) References Cited

U.S. PATENT DOCUMENTS

| | | | |
|---|---|---|---|
| 2016/0006549 | A1 | 1/2016 | Kim et al. |
| 2020/0275417 | A1* | 8/2020 | Takeda ................. H04L 5/0007 |
| 2020/0351872 | A1* | 11/2020 | Cai ................... H04W 72/0446 |

FOREIGN PATENT DOCUMENTS

| | | |
|---|---|---|
| CN | 102904853 A | 1/2013 |
| CN | 102946295 A | 2/2013 |
| CN | 105101285 A | 11/2015 |
| CN | 105376009 A | 3/2016 |
| CN | 105472758 A | 4/2016 |

(Continued)

OTHER PUBLICATIONS

Rospatent, Non-Final Rejection for Russian Patent Application No. 2020118291. dated Mar. 4, 2021. 9 pages with English translation.

(Continued)

*Primary Examiner* — Brian P Cox
(74) *Attorney, Agent, or Firm* — Perkins Coie LLP (57) ABSTRACT

A data transmission method, a terminal device and a network device are provided. The method comprises: a terminal device receives configuration information sent by a network device, wherein the configuration information is used to configure one or more slot format indictors (SFIs) corresponding to one or more bandwidth parts (BWPs) configured for the terminal device; the terminal device determines a currently used target SFI according to the configuration information; and the terminal device performs data transmission according to the target SFI.

14 Claims, 4 Drawing Sheets

(56) References Cited

FOREIGN PATENT DOCUMENTS

| CN | 105636207 | A  | 6/2016  |
|----|-----------|----|---------|
| CN | 107046719 | A  | 8/2017  |
| CN | 107295649 | A  | 10/2017 |
| EP | 3668211   | A1 | 6/2020  |
| RU | 2455780   | C2 | 7/2012  |

OTHER PUBLICATIONS

International Search Report dated Aug. 15, 2018 of PCT/CN2017/112939 (4 pages).
3GPP TSG RAN WG1 Meeting #91—Reno, USA, Nov. 27-Dec. 1, 2017—CATT, On semi-static and dynamic signaling of SFI 7.3.1.3—R1-1720192 (7 pages).
3GPP TSG RAN WG1 Meeting 91—Reno, USA, Nov. 27-Dec. 1, 2017, NTT DOCOMO, INC., Remaining details on group-common PDCCH 7.3.1.3—R1-1720813 (7 pages).
3GPP TSG RAN WG1 Meeting NR#3, Nagoya, Japan, Sep. 18-21, 2017—ZTE, Sanechips, Remaining details on group-common PDCCH—R1-1715520 (5 pages).
3GPP TSG RAN WGI Meeting 91—Reno, USA, Nov. 27-Dec. 1, 2017—7.3.1.3—Huawei, HiSilicon, Remaining details on group-common PDCCH—RI-1719388 (7 pages).
The First Office Action of Chinese Application No. 201780091657.5 dated May 7, 2020 (17 pages).
The Second Office Action of Chinese Application No. 201780091657.5 dated Jul. 30, 2020 (8 pages).
CIPO, Examiner's Report for Canadian Patent Application No. 3084525. dated Jul. 5, 2021. 7 pages.
EPO, Examination Report for European Patent Application No. 17932691.3. dated Jun. 2, 2021. 8 pages.
IPI, Examination Report for Indian Patent Application No. 202017020410. dated Aug. 18, 2021. 7 pages.
3GPP TSG RAN WG1 Meeting #91—Reno, USA, Nov. 9-13, 2017—R1-1720321—Samsung, Remaining Issues on UE-Group Common PDCCH (3 pages).
3GPP TSG RAN WG1 Meeting #91—Reno, USA, Nov. 27-Dec. 1, 2017—R1-1719670—ZTE, Sanechips, Remaining details on group-common PDCCH (12 pages).
3GPP TSG RAN WG1 Meeting 90bis—Prague, CZ, Oct. 9-13, 2017—R1-1718205—NTT DOCOMO, INC., Remaining issues on group-common PDCCH (10 pages).
3GPP TSG RAN WG1 Meeting 91—Reno, USA, Nov. 27-Dec. 1, 2017—R1-1720495—Panasonic, Remaining details on group-common PDCCH (7 pages).
3GPP TSG RAN WG1 Meeting NR#3—Nagoya, Japan, Sep. 18-21, 2017—R1-1716308—Intel Corporation, On group-common PDCCH (10 pages).
Supplemental European Search Report dated Sep. 22, 2020 of European Application No. 17932691.3 (10 pages).
Third Office Action dated Nov. 18, 2020 with translation of Chinese Application No. 201780091657.5 (14 pages).
JPO, Notice of Reasons for Refusal for Japanese Application No. 2020-526887. dated Oct. 15, 2021. 6 pages with English translation.
KIPO, Notification of Reason for Refusal for Korean Application No. 10-2020-7015012. dated Jul. 22, 2021. 8 pages with English translation.
Examination Report for European Application No. 17932691.3 dated Nov. 10, 2021. 7 pages.
Decision of Refusal for Japanese Application No. 2020-526887 dated Apr. 12, 2022. 5 pages with English translation.
Examination Report for Canadian Application No. 3084525 dated Apr. 7, 2022. 5 pages.
Notice of Final Rejection for Korean Application No. 10-2020-7015012 dated Feb. 25, 2022. 8 pages with English translation.
Second Notice of Final Rejection for Korean Application No. 10-2020-7015012 dated Apr. 18, 2022. 4 pages with English translation.
Notice of Allowance for Korean Application No. 10-2022-7016284, dated Jun. 15, 2022, with English translation (3 pages).
3GPP TSG RAN WG1 #90bis, "Remaining issues on slot format indication," R1-1718556 (12 pages).

* cited by examiner

A terminal device receives configuration information sent by a network device, wherein the configuration information is used for respectively configuring Slot Format Indicators (SFIs) corresponding to multiple Bandwidth Parts (BWPs) configured for the terminal device — S210

The terminal device determines a target SFI currently used according to the configuration information — S220

The terminal device performs data transmission according to the target SFI — S230

A network device determines Slot Format Indicators (SFIs) respectively corresponding to multiple Bandwidth Parts (BWPs) configured for a terminal device, wherein the SFI is used for indicating a slot structure within at least one slot — S510

The network device sends configuration information to the terminal device, wherein the configuration information is used for respectively configuring the SFIs corresponding to the multiple BWPs — S520

DATA TRANSMISSION METHOD, TERMINAL DEVICE, AND NETWORK DEVICE

CROSS-REFERENCE TO RELATED APPLICATION

This application is a continuation application of International Application No. PCT/CN2017/112939, filed on Nov. 24, 2017, the entire content of which is incorporated herein by reference.

TECHNICAL FIELD

The present application relates to the field of communication, and more particularly to a method for transmitting data, a terminal device and a network device.

BACKGROUND

In a New Radio (NR) system, a slot or a symbol is taken as a scheduling unit, and each slot includes X symbols, for example, X=14. In one slot, there may be a Down Link (DL) symbol, an Up Link (UL) symbol, a reserved symbol and an unknown symbol, wherein the reserved symbol is not used for uplink or downlink transmission, and the unknown symbol may be changed into an uplink symbol or a downlink symbol through a dynamic signaling and used for uplink or downlink transmission. A specific slot structure may be indicated through a Slot Format Indicator (SFI). For example, a base station may send an SFI in a group common PDCCH to inform a slot structure to be used by a terminal device.

In discussion of the NR system, it is determined that a system bandwidth supported by the NR system is much larger than that of a Long Term Evolution (LTE) system. However, for some terminal devices, due to their limited capacity, they may not support the entire system bandwidth. Therefore, a concept of Bandwidth Part (BWP) is introduced into the NR system, and a bandwidth of each BWP is less than or equal to a maximum system bandwidth. A network device may configure multiple BWPs for a terminal device, and in this case, how to configure an SFI is an urgent problem to be solved.

SUMMARY

Implementations of the present application provide a method for transmitting data, a terminal device and a network device.

In a first aspect, a method for transmitting data is provided. The method includes: receiving, by a terminal device, configuration information sent by a network device, wherein the configuration information is used to respectively configure Slot Format Indicators (SFIs) corresponding to multiple Bandwidth Parts (BWPs) configured for the terminal device; determining, by the terminal device, a currently used target SFI according to the configuration information; and performing, by the terminal device, data transmission according to the target SFI.

Optionally, in an implementation of the present application, the configuration information may be used to indicate a corresponding relationship between a BWP and an SFI, for example, in the corresponding relationship, one BWP may correspond to one SFI, or one BWP may correspond to multiple SFIs, or multiple BWPs may correspond to a same SFI, which is not limited in the implementations of the present application.

In an implementation of the present application, the network device may configure the SFIs respectively corresponding to the multiple BWPs for the terminal device through a signaling, or may configure the SFIs respectively corresponding to the multiple BWPs for the terminal device through multiple signalings, which is not limited in the implementations of the present application.

Optionally, in an implementation of the present application, the SFI may be in a bitmap format, that is, the SFI is used to indicate a symbol type of each symbol within one or more slots, or the SFI may be used to indicate a quantity of uplink symbols and a quantity of downlink symbols included within each slot of one or more slots, or the SFI may be a slot format index, and the slot format index is used to indicate a slot structure of a slot, the slot format index may come from a predefined slot format table or a slot format table configured by a network, or the SFI may indicate a slot structure within each slot of one or more slots through another indication mode. The implementations of the present application do not limit a specific indication mode of the SFI.

In combination with the first aspect, in some possible implementations of the first aspect, determining, by the terminal device, the currently used target SFI according to the configuration information, includes: determining, by the terminal device, an SFI corresponding to a currently activated BWP by the network device as the target SFI.

In combination with the first aspect, in some possible implementations of the first aspect, the target SFI is used to indicate a slot structure within a slot.

In combination with the first aspect, in some possible implementations of the first aspect, performing, by the terminal device, the data transmission according to the target SFI, includes: performing, by the terminal device, the data transmission within each slot according to the target SFI.

In combination with the first aspect, in some possible implementations of the first aspect, the target SFI is used to indicate a slot structure of each slot of N slots, wherein N is a positive integer greater than 1.

In combination with the first aspect, in some possible implementations of the first aspect, performing, by the terminal device, the data transmission according to the target SFI, includes: performing, by the terminal device, the data transmission within every N slots according to the slot structure corresponding to the each slot of the N slots.

In combination with the first aspect, in some implementations of the first aspect, receiving, by the terminal device, the configuration information sent by the network device, includes: receiving, by the terminal device, a Radio Resource Control (RRC) signaling sent by the network device, wherein the RRC signaling includes the configuration information.

The network device may send the configuration information to the terminal device through an existing signaling, for example, the network device may carry the configuration information in an existing downlink RRC message; or, the network device may send the configuration information to the terminal device through an newly added signaling, for example, a special signaling may be added for configuring the SFIs corresponding to the multiple BWP to the terminal device.

Optionally, in an implementation of the present application, the network device may send an SFI corresponding to a certain BWP to the terminal device when activating the BWP, that is, the network device may carry an SFI corresponding to a BWP in a signaling for activating the BWP.

In a second aspect, a method for transmitting data is provided. The method includes: determining, by a network device, Slot Format Indicators (SFIs) respectively corresponding to multiple Bandwidth Parts (BWPs) configured for a terminal device, wherein the SFI is used to indicate a slot structure within at least one slot; and sending, by the network device, configuration information to the terminal device, wherein the configuration information is used to respectively configure the SFIs corresponding to the multiple BWPs.

In combination with the second aspect, in some implementations of the second aspect, sending, by the network device, the configuration information to the terminal device, includes: sending, by the network device, a Radio Resource Control (RRC) signaling to the terminal device, wherein the RRC signaling includes the configuration information.

In a third aspect, a terminal device is provided, which is used for performing the method in the above first aspect or any possible implementation of the first aspect. Specifically, the terminal device includes units for performing the method of the above first aspect or the method in any possible implementation of the above first aspect.

In a fourth aspect, a network device is provided, which is used for performing the method in the above second aspect or any possible implementation of the second aspect. Specifically, the network device includes units used for performing the method of the above second aspect or any possible implementation of the above second aspect.

In a fifth aspect, a terminal device is provided. The terminal device includes a memory, a processor, an input interface, and an output interface. The memory, the processor, the input interface and the output interface are connected through a bus system. The memory is used for storing instructions, and the processor is used for executing the instructions stored in the memory to perform the method of the above first aspect or any possible implementation of the above first aspect.

In a sixth aspect, a network device is provided. The network device includes a memory, a processor, an input interface, and an output interface. The memory, the processor, the input interface and the output interface are connected through a bus system. The memory is used for storing instructions, and the processor is used for executing the instructions stored in the memory to perform the method of the above second aspect or any possible implementation of the above second aspect.

In a seventh aspect, a computer storage medium is provided for storing computer software instructions for executing the method of the first aspect or any possible implementation of the first aspect, and the computer software instructions include programs designed for executing the above aspect.

In an eighth aspect, a computer storage medium is provided. The computer storage medium is used for storing computer software instructions for executing the method in the second aspect or any of the possible implementations of the above second aspect, which includes programs designed for executing the above aspect.

In a ninth aspect, a computer program product including instructions is provided. The computer program product, when running on a computer, causes the computer to perform the method in the first aspect or any of the possible implementations of the above first aspect.

In a tenth aspect, a computer program product containing instructions is provided, when the instructions are run on a computer, the computer is caused to perform the method of the second aspect or any one of optional implementations of the second aspect.

DETAILED DESCRIPTION

In the following, technical solutions in implementations of the present application will be described in combination with drawings of the implementations of the present application.

The technical solutions of the implementations of the present application may be applied to various communication systems, such as: a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, or a future 5G system.

Figure 1:
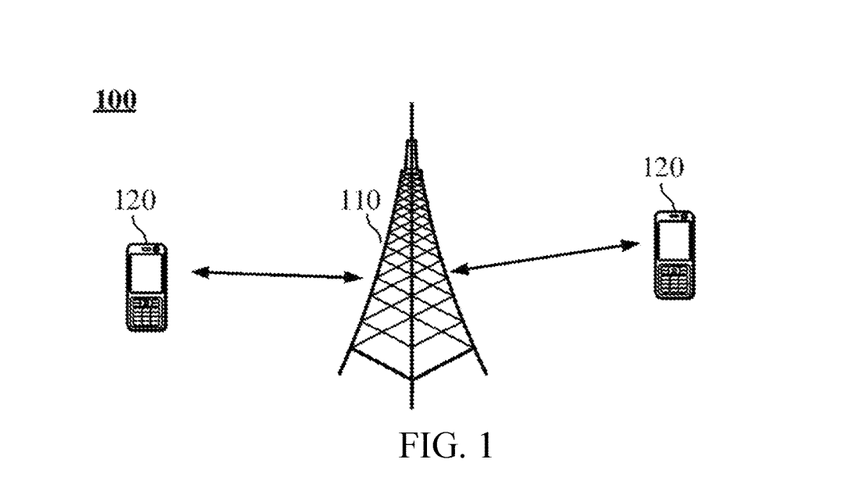
FIG. 1 is a schematic diagram of a communication system according to an implementation of the present application.

FIG. 1 shows a wireless communication system 100 to which an implementation of the present application is applied. The wireless communication system 100 may include a network device 110. The network device 110 may be a device that communicates with a terminal device. The network device 110 may provide communication coverage for a specific geographical area, and may communicate with a terminal device (e.g., UE) in the coverage area. Optionally, the network device 110 may be an Evolutional Node B (eNB or eNodeB) in an LTE system, or a radio controller in a Cloud Radio Access Network (CRAN), or the network device may be a relay station, an access point, an on-board device, a wearable device, a network-side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, the 5G system or network may also be referred to as a New Radio (NR) system or network.

FIG. 1 shows one network device and two terminal devices as an example. Optionally, the wireless communication system 100 may include multiple network devices, and other quantity of terminal devices may be included within the coverage area of each network device, and this is not limited in the implementations of the present application.

Optionally, the wireless communication system 100 may further include other network entities such as a network controller, a mobile management entity, and this is not limited in the implementations of the present application.

In an implementation of the present application, a BWP configured by the network device for the terminal device may include at least one of following parameters: 1. numerology for identifying a carrier spacing; 2. central frequency point; and 3. bandwidth, which is less than or equal to a maximum system bandwidth.

Thus, BWP is a concept of a frequency domain dimension, and the terminal device may support one activated BWP at a point in time, that is, the terminal device expects to transmit data on a bandwidth specified for the activated BWP, such as transmitting a control signaling, or uplink or downlink data, or receiving a system message.

In an implementation of the present application, the terminal device is configured with multiple BWPs. When the network device activates a certain one of the BWPs, the terminal device may perform data transmission according to a frequency domain resource corresponding to the BWP. At the same time, which time domain resources the terminal device uses for data transmission is a problem worth studying.

In view of this, an implementation of the present application provides a method for transmitting data, by which, an SFI used can be determined according to a BWP, so that data transmission may be performed on a time domain resource indicated by the SFI.

Figure 2:
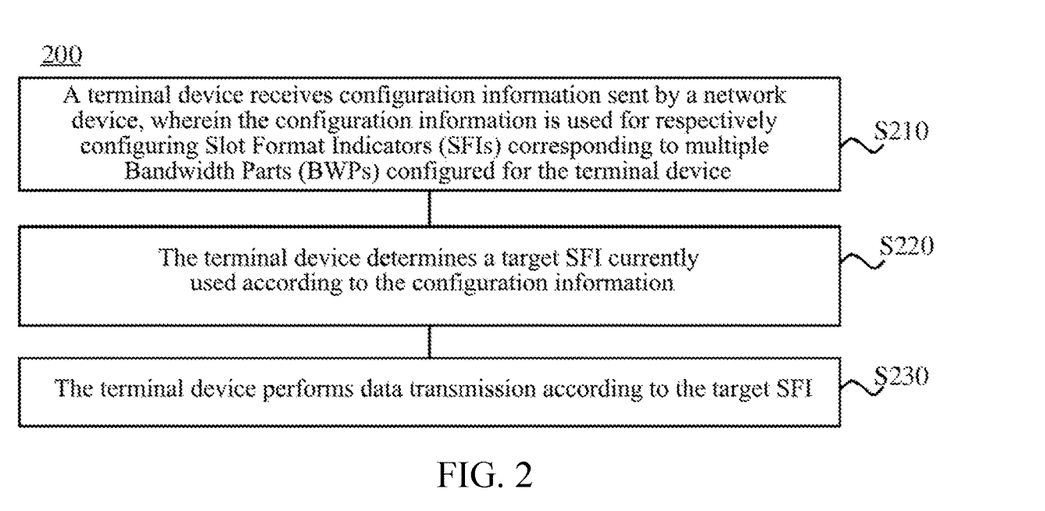
FIG. 2 is a schematic flowchart of a method for transmitting data according to an implementation of the present application.

FIG. 2 is a schematic flowchart of a method for transmitting data according to an implementation of the present application. The method 200 may be performed by the terminal device in the wireless communication system shown in FIG. 1. As shown in FIG. 2, the method 200 may include acts S210, S220 and S230.

In S210, the terminal device receives configuration information sent by a network device, wherein the configuration information is used to respectively configure Slot Format Indicators (SFIs) corresponding to multiple Bandwidth Parts (BWPs) configured for the terminal device.

In S220, a terminal device determines a currently used target SFI according to the configuration information.

In S230, the terminal device performs data transmission according to the target SFI.

In the implementation of the present application, the network device may respectively configure SFIs corresponding to multiple BWPs of the terminal device, i.e., multiple BWPs configured for the terminal device may respectively correspond to independent SFIs, so when the network device activates a certain BWP, the terminal device may determine the SFI corresponding to the BWP, and may use the SFI corresponding to the BWP to perform data transmission.

Optionally, in an implementation of the present application, the configuration information may be used to indicate a corresponding relationship between a BWP and a SFI, for example, in the corresponding relationship, one BWP may correspond to one SFI, or one BWP may correspond to multiple SFIs, or multiple BWPs may correspond to a same SFI, which is not limited in the implementation of the present application.

Optionally, in some implementations, S210 may include: the terminal device receives a Radio Resource Control (RRC) signaling sent by the network device, wherein the RRC signaling includes the configuration information.

That is, the network device may semi-statically configure the SFIs corresponding to the multiple BWPs through a Radio Resource Control (RRC) signaling, and the terminal device, after acquiring the configuration information, may determine an SFI corresponding to a currently activated BWP as a target SFI according to the BWP, and use the target SFI to perform data transmission.

It should be noted that in the implementation of the present application, the network device may configure SFIs corresponding to the multiple BWPs for the terminal device through a signaling, or may configure SFIs respectively corresponding to the multiple BWPs for the terminal device through multiple signalings, which is not limited in the implementation of the present application.

It should also be noted that the network device may send the configuration information to the terminal device through an existing signaling, for example, the network device may carry the configuration information in an existing downlink RRC message; or, the network device may send the configuration information to the terminal device through an newly added signaling, for example, a special signaling may be added for configuring the SFIs corresponding to the multiple BWPs for the terminal device.

Optionally, in the implementation of the present application, the network device may send an SFI corresponding to a certain BWP to the terminal device when activating the BWP, that is, the network device may carry an SFI corresponding to a BWP in a signaling for activating the BWP. After receiving the signaling, the terminal device knows that the network device has activated the BWP, and at the same time, the terminal device may obtain the SFI corresponding to the BWP from the signaling, and use the SFI to perform data transmission.

In the implementation of the present application, an SFI corresponding to each BWP may be used to indicate a slot structure within one slot, or may be used to indicate a slot structure within each slot of multiple slots.

Specifically, if an SFI is used to indicate a slot structure within one slot, the terminal device may perform data transmission within each slot according to the SFI; or if the SFI is used to indicate a slot structure within each slot of multiple (e.g., N, wherein the N is a positive integer greater than 1) slots, i.e., a same slot structure is repeated for every N slots, then the slot structure of the slot (kN) is the same, the slot structure of the slot (kN+1) is the same, and the slot structure of the slot (kN+2) is the same, etc., wherein the k is 0, 1, 2, . . . , therefore, the terminal device may take N slots as a cycle, and within each cycle perform data transmission according to the slot structure corresponding to each slot of the N slots.

Optionally, in an implementation of the present application, the SFI may be in a bitmap format, that is, the SFI is used to indicate a symbol type of each symbol within one or more slots, or the SFI may be used to indicate a quantity of uplink symbols and a quantity of downlink symbols included in each slot of one or more slots, or the SFI may be a slot format index, and the slot format index is used to indicate a slot structure of a slot, the slot format index may come from a predefined slot format table or a slot format table configured by a network, or the SFI may indicate a slot structure within each slot of one or more slots through another indication mode. The implementation of the present application does not limit a specific indication mode of the SFI.

Hereinafter, a mode of configuring a corresponding SFI according to a BWP will be described in detail with reference to specific examples shown in FIGS. 3 and 4.

Figure 3:
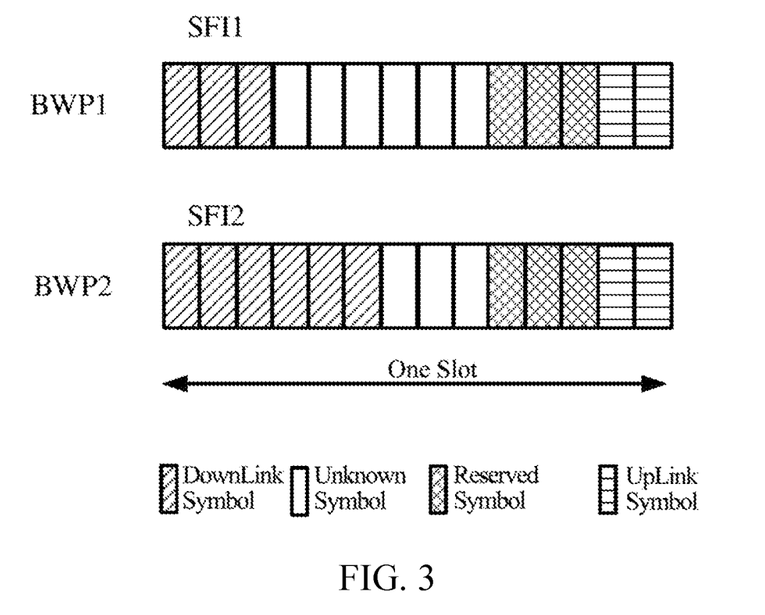
FIG. 3 is a schematic diagram of different BWPs corresponding to different SFIs according to an example.

FIG. 3 is a schematic diagram of an example in which different BWPs correspond to different SFIs. In the example, BWP1 and BWP2 are two BWPs configured for a terminal device, wherein subcarrier spacings of the BWP1 and the BWP2 are the same, therefore slot lengths of the BWP1 and the BWP2 are the same, and the network device may configure the BWP1 and the BWP2 to correspond to different SFIs respectively. For example, an SFI corresponding to the BWP1 may be configured as SFI1, i.e., 3 downlink symbols and 2 uplink symbols are configured for the BWP1 within one slot, an SFI corresponding to the BWP2 is configured as SFI2, i.e., 6 downlink symbols and 2 uplink symbols are configured within one slot for the BWP2.

Figure 4:
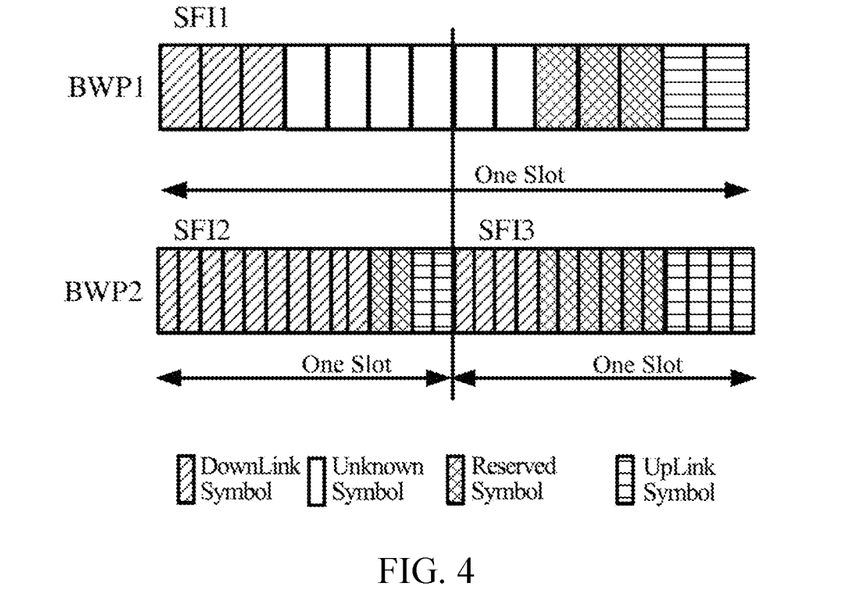
FIG. 4 is a schematic diagram of different BWPs corresponding to different SFIs according to another example.

FIG. 4 is schematic diagram of another example in which different BWPs corresponding to different SFIs. In the example, BWP1 and BWP2 are two BWPs configured for a terminal device, wherein subcarrier spacings of the BWP1 and the BWP2 are different, therefore slot lengths of the BWP1 and the BWP2 are different. Taking a slot length of the BWP1 is twice of a slot length of the BWP2 as an example, the network device may configure the BWP1 and the BWP2 to respectively correspond to different SFIs. For example, an SFI corresponding to the BWP1 may be configured as SFI1, i.e., 3 downlink symbols and 2 uplink symbols are configured for the BWP1 within one slot, SFIs corresponding to BWP2 are configured as SFI2 and SFI3, and the SFI2 and the SFI3 are respectively used to indicate the slot structures within two slots, the SFI2 is used to indicate that 10 downlink symbols and 2 uplink symbols are configured for the BWP2 within a first slot of the two slots, and the SFI3 is used to indicate that 4 downlink symbols and 2 uplink symbols are configured in a second slot of the two slots for the BWP2.

The above formats of the SFI1, the SFI2 and the SFI3 are only examples but not restrictions. The network device may configure a same SFI for the BWP1 and the BWP2, or may determine a corresponding SFI according to a factor such as types or requirements of services transmitted on the BWP1 and the BWP2. For example, if a delay sensitive service is transmitted, a quantity of downlink symbols in the SFI may be determined to be larger, or if a delay insensitive service is transmitted, a quantity of downlink symbols in the SFI may be determined to be smaller.

Therefore, in the method for transmitting data according to the implementation of the present application, a network device may respectively configure SFIs corresponding to multiple BWPs configured for a terminal device, so that the terminal device may determine the SFI corresponding to the currently activated BWP according to the BWP, and may perform data transmission according to the SFI.

The method for transmitting data according to the implementation of the present application is described from a perspective of the terminal device above in combination with FIG. 2 to FIG. 4, and a method for transmitting data according to another implementation of the present application is described in detail from a perspective of a network device below in combination with FIG. 5. It should be understood that the description of the network device side corresponds to the description of the terminal device side, and the above description may be referred to for similar descriptions, which will not be repeated here to avoid repetition.

Figure 5:
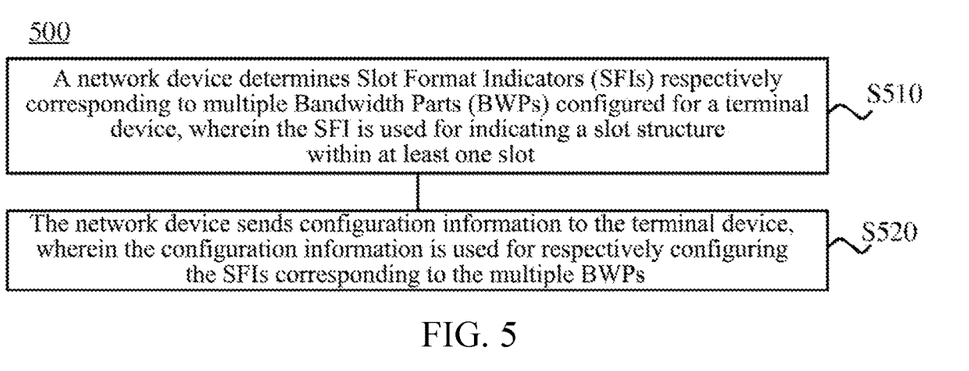
FIG. 5 is a schematic flowchart of a method for transmitting data according to another implementation of the present application.

FIG. 5 is a schematic flowchart of a method for transmitting data according to another implementation of the present application. As shown in FIG. 5, the method 500 includes acts S510 and S520.

In S510, a network device determines Slot Format Indicators (SFIs) respectively corresponding to multiple Bandwidth Parts (BWPs) configured for a terminal device, wherein the SFI is used to indicate a slot structure within at least one slot.

In S520, the network device sends configuration information to the terminal device, wherein the configuration information is used to respectively configure the SFIs corresponding to the multiple BWPs.

Optionally, in some implementations, S520 may specifically include: the network device sends a Radio Resource Control (RRC) signaling to the terminal device, wherein the RRC signaling includes the configuration information.

Method implementations of the present application are described in detail above with reference to FIG. 4 and FIG. 5, and device implementations of the present application are described in detail below with reference to FIGS. 6 to 9. It should be understood that the device implementations and the method implementations correspond to each other, and description of the method implementations may be referred to for similar description of the device implementations.

Figure 6:
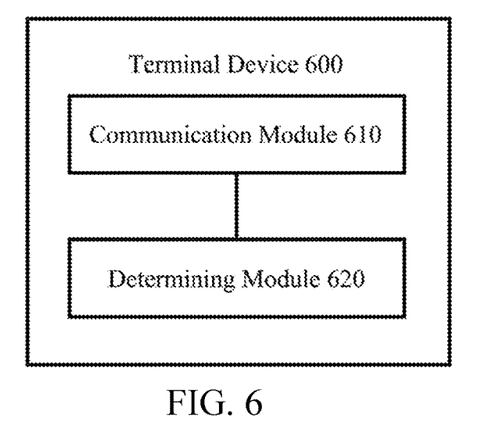
FIG. 6 is a schematic block diagram of a terminal device according to an implementation of the present application.

FIG. 6 shows a schematic block diagram of a terminal device 600 according to an implementation of the present application. As shown in FIG. 6, the terminal device 600 includes a communication module 610 and a determining module 620.

The communication module 610 is configured to receive configuration information sent by a network device, wherein the configuration information is used to respectively configure Slot Format Indicators (SFIs) corresponding to multiple Bandwidth Parts (BWPs) configured for the terminal device; the determining module 620 is configured to determine a currently used target SFI according to the configuration information; and the communication module 620 is further configured to perform data transmission according to the target SFI.

Optionally, in some implementations, the determining module 620 is specifically configured to: determine an SFI corresponding to a currently activated BWP by the network device as the target SFI.

Optionally, in some implementations, the target SFI is used to indicate a slot structure within a slot.

Optionally, in some implementations, the communication module 610 is further configured to: perform, the data transmission within each slot according to the target SFI.

Optionally, in some implementations, the target SFI is used to indicate a slot structure of each slot of N slots, wherein N is a positive integer greater than 1.

Optionally, in some implementations, the communication module 610 is further configured to: perform the data transmission within every N slots according to a slot structure corresponding to each slot of the N slots.

Optionally, in some implementations, the communication module 610 is specifically configured to: receive a Radio Resource Control (RRC) signaling sent by the network device, wherein the RRC signaling includes the configuration information.

It should be understood that the terminal device 600 according to the implementation of the present application may correspond to the terminal device in the method 200 of the present application, and the above-mentioned and other operations and/or functions of various units in the terminal device 600 are respectively for implementing the corresponding processes of the terminal device in the method 200 shown in FIG. 2, which will not be repeated here for sake of conciseness.

Figure 7:
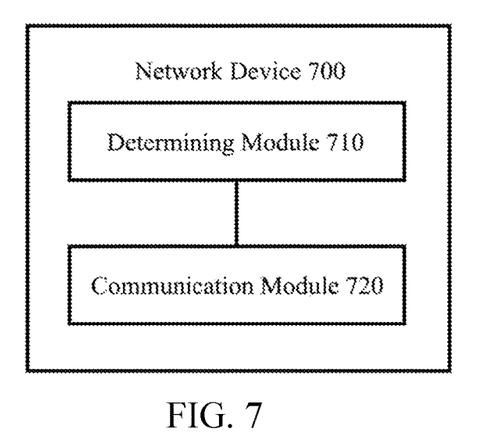
FIG. 7 is a schematic block diagram of a network device according to an implementation of the present application.

FIG. 7 shows a schematic block diagram of a network device 700 according to an implementation of the present application. As shown in FIG. 7, the terminal device 700 includes a determining module 710 and a communication module 720.

The determining module 710 is configured to determine Slot Format Indicators (SFIs) respectively corresponding to multiple Bandwidth Parts (BWPs) configured for a terminal device, wherein the SFI is used to indicate a slot structure within at least one slot; and the communication module 720 is configured to send configuration information to the terminal device, wherein the configuration information is used to respectively configure the SFIs corresponding to the multiple BWPs.

Optionally, in some implementations, the communication module 720 is specifically configured to: send a Radio Resource Control (RRC) signaling to the terminal device, wherein the RRC signaling includes the configuration information.

It should be understood that the network device 700 according to the implementation of the present application may correspond to the network device in the method implementations of the present application, and the above and other operations and/or functions of various units in the network device 700 are respectively for implementing the corresponding process of the network device in the method 500 shown in FIG. 5, which will not be repeated here for sake of conciseness.

Figure 8:
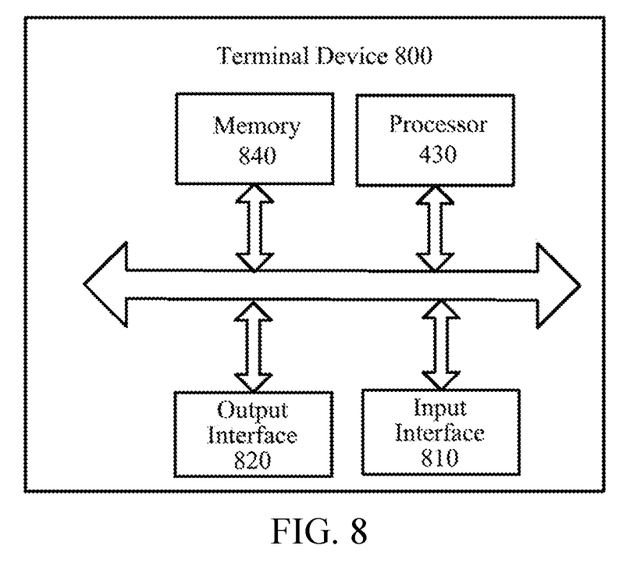
FIG. 8 is a schematic block diagram of a terminal device according to another implementation of the present application.

As shown in FIG. 8, an implementation of the present application also provides a terminal device 800, wherein the terminal device 800 may be the terminal device 600 in FIG. 6, which may be used for performing the contents corresponding to the terminal device in the method 200 in FIG. 2. The terminal device 800 includes an input interface 810, an output interface 820, a processor 830, and a memory 840. The input interface 810, the output interface 820, the processor 830, and the memory 840 may be connected through a bus system. The memory 840 is used for storing programs, instructions, or codes. The processor 830 is used for executing the programs, instructions, or codes in the memory 840 to control the input interface 810 to receive signals, to control the output interface 820 to send signals, and to accomplish the operations in the foregoing method implementations.

It should be understood that, in an implementation of the present application, the processor 830 may be a central processing unit (CPU), or the processor 830 may be other general purpose processor, digital signal processor (DSP), application specific integrated circuit (ASIC), field programmable gate array (FPGA), or other programmable logic device, discrete gate or transistor logic device, or discrete hardware component, etc. The general purpose processor may be a microprocessor, or the processor may be any conventional processor or the like.

The memory 840 may include a read-only memory and a random access memory, and provide instructions and data to the processor 830. A portion of memory 840 may include a non-volatile random access memory. For example, the memory 840 may also store information of device type.

In implementation processes, various contents of the methods described above may be accomplished by integrated logic circuits of hardware or instructions in the form of software in the processor 830. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 840, and the processor 830 reads the information in the memory 840, and accomplishes the contents of the above method in combination with its hardware. In order to avoid repetition, it will not be described in detail here.

In a specific implementation, the communication module 610 in the terminal device 600 shown in FIG. 6 may be implemented by the input interface 810 and the output interface 820 of FIG. 8, and the determining module 620 in the terminal device 600 shown in FIG. 6 may be implemented by the processor 830 of FIG. 8.

Figure 9:
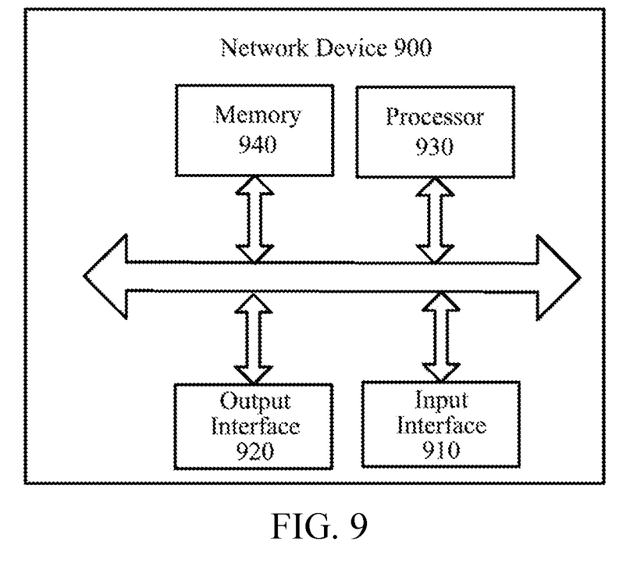
FIG. 9 is a schematic block diagram of a network device according to another implementation of the present application.

As shown in FIG. 9, an implementation of the present application also provides a network device 900, the network device 900 may be the network device 700 in FIG. 7, and may be used for performing the contents corresponding to the network device in the method 500 in FIG. 5. The network device 900 includes an input interface 910, an output interface 920, a processor 930, and a memory 940. The input interface 910, the output interface 920, the processor 930, and the memory 940 may be connected through a bus system. The memory 940 is used for storing programs, instructions, or codes. The processor 930 is used for executing programs, instructions, or codes in the memory 940 to control the input interface 910 to receive signals, to control the output interface 920 to send signals, and to accomplish the operations in the foregoing method implementations.

It should be understood that, in an implementation of the present application, the processor 930 may be a central processing unit (CPU), or the processor 930 may be other general purpose processor, digital signal processor (DSP), application specific integrated circuit (ASIC), field programmable gate array (FPGA), or other programmable logic device, discrete gate or transistor logic device, or discrete hardware component, etc. The general purpose processor may be a microprocessor, or the processor may be any conventional processor or the like.

The memory 940 may include a read-only memory and a random access memory, and provide instructions and data to the processor 930. A portion of memory 940 may include a non-volatile random access memory. For example, the memory 940 may also store information of device type.

In implementation processes, various contents of the methods described above may be accomplished by integrated logic circuits of hardware or instructions in the form of software in the processor 930. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 940, and the processor 930 reads the information in the memory 940, and accomplishes the contents of the above method in combination with its hardware. In order to avoid repetition, it will not be described in detail here.

In a specific implementation, the communication module 720 in the network device 700 shown in FIG. 7 may be implemented by the input interface 910 and the output interface 920 of FIG. 9, and the determining module 710 in the network device 700 may be implemented by the processor 930 of FIG. 9.

An implementation of the present application also provides a computer readable storage medium that stores one or more programs including instructions that, when performed by a portable electronic device including multiple application programs, enable the portable electronic device to perform the method of the implementations shown in FIGS. 2 and 5.

An implementation of the present application also provides a computer program, which includes instructions that, when performed by a computer, enable the computer to execute the corresponding process of the method of the implementations shown in FIGS. 2 and 5.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects before and after the symbol "/" have an "or" relationship.

It should be understood that in various implementations of the present application, values of sequence numbers in the above-mentioned process do not imply an order of execution, and an order of execution of each process should be determined by its function and internal logic, and should not constitute any limitation on an implementation process of the implementation of the present application.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application. The aforementioned storage media include a U disk, a mobile hard disk, a read-only memory (ROM), a random access memory (RAM), a magnetic disk or an optical disk, and other media capable of storing program codes.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

I claim:

1. A method for transmitting data, comprising:
receiving, by a terminal device, configuration information sent by a network device, wherein the configuration information is used to configure one or more Slot Format Indicators (SFIs) corresponding to one or more Bandwidth Parts (BWPs) configured for the terminal device;
determining, by the terminal device, a currently used target SFI according to the configuration information; and
performing, by the terminal device, data transmission according to the target SFI;
wherein the receiving, by the terminal device, the configuration information sent by the network device comprises:
receiving, by the terminal device, a Radio Resource Control (RRC) signaling sent by the network device, wherein the RRC signaling comprises the configuration information, and the configuration information comprises a corresponding relationship between a BWP and an SFI.

2. The method according to claim 1, wherein the target SFI is an SFI corresponding to a currently activated BWP.

3. The method according to claim 1, wherein the target SFI is used to indicate a slot structure within a slot.

4. The method according to claim 3, wherein performing, by the terminal device, the data transmission according to the target SFI, comprises:
performing, by the terminal device, the data transmission within each slot according to a corresponding target SFI.

5. The method according to claim 1, wherein the target SFI is used to indicate a slot structure of a corresponding slot of N slots, wherein N is a positive integer greater than 1.

6. The method according to claim 5, wherein performing, by the terminal device, the data transmission according to the target SFI, comprises:
performing, by the terminal device, the data transmission within every N slots according to the slot structure corresponding to the each slot of the N slots.

7. A method for transmitting data, comprising:
determining, by a network device, one or more Slot Format Indicators (SFIs) corresponding to one or more Bandwidth Parts (BWPs) configured for a terminal device, wherein the SFI is used to indicate a slot structure within at least one slot; and
sending, by the network device, configuration information to the terminal device through a Radio Resource Control (RRC) signaling, wherein the configuration information is used to configure the one or more SFIs corresponding to the one or more BWPs; wherein the RRC signaling comprises the configuration information, and the configuration information comprises a corresponding relationship between a BWP and an SFI.

8. A terminal device, comprising: a memory, a processor, an input interface, and an output interface; wherein the processor is configured to execute instructions stored in the memory and cause the terminal device to:
receive, via the input interface, configuration information sent by a network device through a Radio Resource Control (RRC) signaling, wherein the configuration information is used to configure one or more Slot Format Indicators (SFIs) corresponding to one or more Bandwidth Parts (BWPs) configured for the terminal device; wherein the RRC signaling comprises the configuration information, and the configuration information comprises a corresponding relationship between a BWP and an SFI;
determine a currently used target SFI according to the configuration information; and
control the input interface or the output interface to perform data transmission according to the target SFI.

9. The terminal device according to claim 8, wherein the target SFI is an SFI corresponding to a currently activated BWP.

10. The terminal device according to claim 8, wherein the target SFI is used to indicate a slot structure within a slot.

11. The terminal device according to claim 10, wherein the terminal device is further caused by the processor to:
perform the data transmission within each slot according to a corresponding target SFI.

12. The terminal device according to claim 8, wherein the target SFI is used to indicate a slot structure of a corresponding slot of N slots, wherein N is a positive integer greater than 1.

13. The terminal device according to claim 12, wherein the terminal device is further caused by the processor to:
perform the data transmission within every N slots according to the slot structure corresponding to the each slot of the N slots.

14. A network device, comprising: a memory storing instructions, a processor, an input interface, and an output interface; wherein the processor is configured to execute the instructions stored in the memory and cause the network device to:
determine one or more Slot Format Indicators (SFIs) corresponding to one or more Bandwidth Parts (BWPs) configured for a terminal device, wherein the SFI is used to indicate a slot structure within at least one slot; and
control the output interface to send configuration information to the terminal device through a Radio Resource Control (RRC) signaling, wherein the configuration information is used to configure the one or more SFIs corresponding to the one or more BWPs; wherein the RRC signaling comprises the configuration information, and the configuration information comprises a corresponding relationship between a BWP and an SFI.

* * * * *

UNITED STATES PATENT AND TRADEMARK OFFICE
CERTIFICATE OF CORRECTION

PATENT NO. : 11,503,608 B2
APPLICATION NO. : 16/872838
DATED : November 15, 2022
INVENTOR(S) : Jia Shen It is certified that error appears in the above-identified patent and that said Letters Patent is hereby corrected as shown below:

On the Title Page

Delete Title page and replace with attached Title page.

In the Claims

Cancel Claims 1-14 at Column 12, Line 47 through Column 14, Line 43, and insert the following Claims 1-6:
-- 1. A method for transmitting data, comprising:
receiving, by a terminal device, configuration information through a Radio Resource Control (RRC) signaling sent by a network device, wherein the configuration information is used to configure one or more Slot Format Indicators (SFIs) corresponding to one or more Bandwidth Parts (BWPs) configured for the terminal device; wherein the configuration information comprises a corresponding relationship between a BWP and an SFI; determining, by the terminal device, a currently used target SFI according to the configuration information; and performing, by the terminal device, data transmission according to the target SFI;
wherein the SFI is used to indicate a slot structure corresponding to each slot of N slots, wherein a same slot structure is repeated for every N slots, N is a positive integer greater than 1;
wherein performing, by the terminal device, the data transmission according to the target SFI, comprises:
taking, by the terminal device, N slots as a cycle, and
performing, by the terminal device, the data transmission within every N slots according to the slot structure corresponding to the each slot of the N slots.

2. The method according to claim 1, wherein the target SFI is an SFI corresponding to a currently activated BWP.

3. A method for transmitting data, comprising:
determining, by a network device, one or more Slot Format Indicators (SFIs) corresponding to one or Signed and Sealed this
Thirteenth Day of August, 2024

*Katherine Kelly Vidal*

Katherine Kelly Vidal
*Director of the United States Patent and Trademark Office* more Bandwidth Parts (BWPs) configured for a terminal device, wherein the SFI is used to indicate a slot structure within at least one slot; and sending, by the network device, configuration information to the terminal device through a Radio Resource Control (RRC) signaling, wherein the configuration information is used to configure the one or more SFIs corresponding to the one or more BWPs; wherein the RRC signaling comprises the configuration information, and the configuration information comprises a corresponding relationship between a BWP and an SFI;

wherein the SFI is used to indicate a slot structure corresponding to each slot of N slots for the terminal device to take N slots as a cycle and perform data transmission within every N slots according to the slot structure corresponding to the each slot of the N slots, wherein a same slot structure is repeated for every N slots, N is a positive integer greater than 1.

4. A terminal device, comprising: a memory, a processor, an input interface, and an output interface; wherein the processor is configured to execute instructions stored in the memory and cause the terminal device to:

receive, via the input interface, configuration information sent by a network device through a Radio Resource Control (RRC) signaling, wherein the configuration information is used to configure one or more Slot Format Indicators (SFIs) corresponding to one or more Bandwidth Parts (BWPs) configured for the terminal device; wherein the RRC signaling comprises the configuration information, and the configuration information comprises a corresponding relationship between a BWP and an SFI;

determine a currently used target SFI according to the configuration information; and control the input interface or the output interface to perform data transmission according to the target SFI;

wherein the SFI is used to indicate a slot structure corresponding to each slot of N slots, wherein a same slot structure is repeated for every N slots, N is a positive integer greater than 1;

wherein performing data transmission according to the target SFI comprise:

taking N slots as a cycle and performing the data transmission within every N slots according to the slot structure corresponding to the each slot of the N slots.

5. The terminal device according to claim 4, wherein the target SFI is an SFI corresponding to a currently activated BWP.

6. A network device, comprising: a memory storing instructions, a processor, an input interface, and an output interface; wherein the processor is configured to execute the instructions stored in the memory and cause the network device to:

determine one or more Slot Format Indicators (SFIs) corresponding to one or more Bandwidth Parts (BWPs) configured for a terminal device, wherein the SFI is used to indicate a slot structure within at least one slot; and control the output interface to send configuration information to the terminal device through a Radio Resource Control (RRC) signaling, wherein the configuration information is used to configure the one or more SFIs corresponding to the one or more BWPs; wherein the RRC signaling comprises the configuration information, and the configuration information comprises a corresponding relationship between a BWP and an SFI; wherein the SFI is used to indicate a slot structure corresponding to each slot of N slots for the terminal device to take N slots as a cycle and perform data transmission within every N slots according to the slot structure corresponding to the each slot of the N slots, wherein a same slot structure is repeated for every N slots, N is a positive integer greater than 1. --

CERTIFICATE OF CORRECTION (continued)

(12) United States Patent
Shen (10) Patent No.: US 11,503,608 B2
(45) Date of Patent: Nov. 15, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 25 days.

(21) Appl. No.: 16/872,838

(22) Filed: May 12, 2020

(65) Prior Publication Data
US 2020/0275452 A1    Aug. 27, 2020

Related U.S. Application Data

(63) Continuation of application No. PCT/CN2017/112939, filed on Nov. 24, 2017.

(51) Int. Cl.
H04W 72/04    (2009.01)
H04L 5/00    (2006.01)
H04W 76/27    (2018.01)

(52) U.S. Cl.
CPC ....... *H04W 72/0493* (2013.01); *H04L 5/0092* (2013.01); *H04W 72/0446* (2013.01); *H04W 76/27* (2018.02)

(58) Field of Classification Search
CPC ............ H04L 5/0092; H04W 72/0446; H04W 72/0493; H04W 76/27
See application file for complete search history.

(56) References Cited

U.S. PATENT DOCUMENTS

2016/0006549 A1    1/2016    Kim et al.
2020/0275417 A1*   8/2020    Takeda .................. H04L 5/0007
2020/0351872 A1*   11/2020   Cai .................. H04W 72/0446

FOREIGN PATENT DOCUMENTS

| CN | 102904853 A | 1/2013 |
| CN | 102946295 A | 2/2013 |
| CN | 105101285 A | 11/2015 |
| CN | 105376009 A | 3/2016 |
| CN | 105472758 A | 4/2016 |

(Continued)

OTHER PUBLICATIONS

Rospatent, Non-Final Rejection for Russian Patent Application No. 2020118291, dated Mar. 4, 2021. 9 pages with English translation.

(Continued)

*Primary Examiner* — Brian P Cox
(74) *Attorney, Agent, or Firm* — Perkins Coie LLP (57) ABSTRACT

A data transmission method, a terminal device and a network device are provided. The method comprises: a terminal device receives configuration information sent by a network device, wherein the configuration information is used to configure one or more slot format indictors (SFIs) corresponding to one or more bandwidth parts (BWPs) configured for the terminal device; the terminal device determines a currently used target SFI according to the configuration information; and the terminal device performs data transmission according to the target SFI.

6 Claims, 4 Drawing Sheets